(12) United States Patent
Smith, Jr.

(10) Patent No.: US 8,732,709 B2
(45) Date of Patent: May 20, 2014

(54) TRANSACTION MANAGEMENT IN A WEB SERVICE MESSAGING ENVIRONMENT

(75) Inventor: Marshall L. Smith, Jr., Apex, NC (US)

(73) Assignee: Red Hat, Inc., Raleigh, NC (US)

( * ) Notice: Subject to any disclaimer, the term of this patent is extended or adjusted under 35 U.S.C. 154(b) by 991 days.

(21) Appl. No.: 12/012,941

(22) Filed: Feb. 5, 2008

(65) Prior Publication Data

US 2009/0199210 A1   Aug. 6, 2009

(51) Int. Cl.
*G06F 9/46* (2006.01)
*G06F 7/00* (2006.01)

(52) U.S. Cl.
USPC .......................... 718/101; 707/607; 719/330

(58) Field of Classification Search
USPC .......................... 707/607; 718/101; 719/330
See application file for complete search history.

(56) References Cited

U.S. PATENT DOCUMENTS

| | | | | |
|---|---|---|---|---|
| 5,884,327 A * | 3/1999 | Cotner et al. | ........................... | 1/1 |
| 6,334,114 B1 * | 12/2001 | Jacobs et al. | ................. | 705/26.8 |
| 6,449,699 B2 * | 9/2002 | Franke et al. | ................. | 711/147 |
| 7,406,523 B1 * | 7/2008 | Kruy et al. | ..................... | 709/227 |
| 7,480,934 B2 * | 1/2009 | Chan et al. | ..................... | 709/225 |
| 7,506,342 B2 * | 3/2009 | Mousseau et al. | ............. | 719/320 |
| 7,539,746 B2 * | 5/2009 | Bankier et al. | ................ | 709/224 |
| 7,549,083 B2 * | 6/2009 | Eguchi et al. | ................... | 714/15 |
| 7,571,164 B2 * | 8/2009 | Kuersch et al. | ........................ | 1/1 |
| 7,698,286 B2 * | 4/2010 | Popp et al. | .................... | 707/607 |
| 7,831,693 B2 * | 11/2010 | Lai | ................................. | 709/220 |
| 7,908,286 B2 * | 3/2011 | Krishnaprasad et al. | ..... | 707/759 |
| 2006/0074877 A1 * | 4/2006 | Kuersch et al. | ................... | 707/3 |
| 2006/0129414 A1 * | 6/2006 | Hallamaa et al. | ................. | 705/1 |
| 2006/0174224 A1 * | 8/2006 | Parkinson et al. | ............ | 717/120 |
| 2006/0206894 A1 * | 9/2006 | Jung et al. | ..................... | 718/100 |
| 2009/0182816 A1 * | 7/2009 | Yu | ................................ | 709/206 |

* cited by examiner

*Primary Examiner* — Charles E Anya
(74) *Attorney, Agent, or Firm* — Lowenstein Sandler LLP (57) ABSTRACT

A method and apparatus for managing database transactions in a web service messaging environment. In one embodiment, the method includes receiving a web service call indicating a beginning of a database transaction from a client, and creating a database transaction in response to this web service call. The method further includes receiving subsequent web service calls from the client, and for each subsequent web service call, associating a corresponding web service call with the database transaction, and performing the corresponding web service call. Afterwards, the database transaction is terminated upon committing or rolling back data resulting from the subsequent web service calls.

22 Claims, 6 Drawing Sheets

TRANSACTION MANAGEMENT IN A WEB SERVICE MESSAGING ENVIRONMENT

TECHNICAL FIELD

Embodiments of the present invention relate to database transactions, and more specifically to transaction management in a web service messaging environment.

BACKGROUND

A web service is typically hosted by a web server or a web application server that provides the HTTP connection between the client software and the server-side software handling the implementation of application programming interfaces (APIs). The server manages a pool of threads to process concurrent web requests, thereby providing parallel processing of those requests. Additionally, servers that manage a pool of database connections typically bind an open database connection to the current thread for use during the entire HTTP transaction, freeing it back into the pool upon completion.

A web service API call typically is stateless and therefore not conductive to transactions across multiple invocations. For example, an API call performed via the XML-RPC protocol (remote procedure call protocol utilizing XML to encode its calls) includes no information that would tie the current API call to previous API calls during the same client session. Accordingly, client software lacks the ability to request that multiple units of work that are part of a single logical database transaction be committed or rolled back depending on some client-determined final status.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for managing database transactions in web service messaging environment. A transaction manager hosted by a server may receive from a client a web service call indicating the beginning of a database transaction. In response, the transaction manager may create a new database transaction, and may associate each subsequent web service call received from the client with the new database transaction. The transaction manager may terminate the database transaction upon committing or rolling back data resulting from the subsequent web service calls.

In the following description, numerous specific details are set forth such as examples of specific systems, languages, components, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 1:
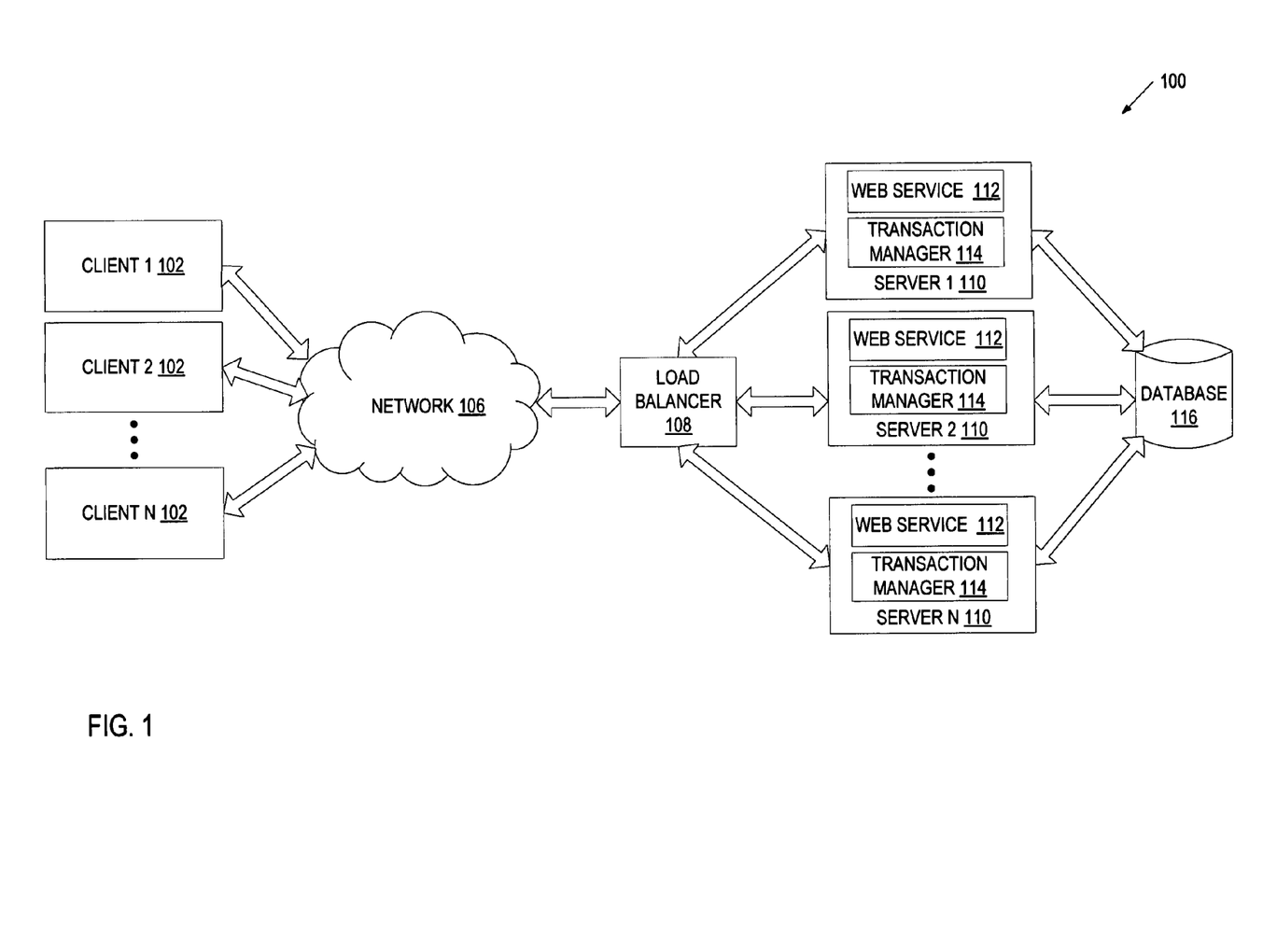
FIG. 1 illustrates an exemplary network architecture in which embodiments of the present invention may operate.

FIG. 1 illustrates an exemplary network architecture 100 in which embodiments of the present invention may operate. The network architecture 100 may include clients 102 coupled to a network 106 (e.g., a local area network (LAN), wide area network (WAN), etc.). Each client 102 may be a computing device such as, for example, a desktop computer, laptop computer, server, etc.

The network architecture 110 may also include a pool of servers 110 (e.g., web servers or web application servers) that host web service instances 112. The web service instances (or simply web services) 112 perform operations requested by clients 102. These operations involve database activities (add, delete, update). Each server 110 may represent a single computing device or multiple servers 110 may represent a single computing device. Each server 110 may host a transaction manager 114 that provides application programming interfaces (APIs) for managing database transactions and for invoking a corresponding web service 112 to perform database operations that are part of a database transaction.

Each server 110 maintains an HTTP connection between the client software and the transaction manager 114 and manages a pool of threads to process concurrent web requests of clients 102, thereby providing parallel processing of those requests. Additionally, the servers 110 can manage a pool of connections with a database 116 and can bind an open database connection to the current thread for use during the HTTP transaction.

Clients 102 may issue web requests using the XML-RPC protocol, SOAP (simple object access protocol), JSON-RPC (Java script object notation-remote procedure call) protocol, or any other protocol facilitating stateless web service calls (calls having no knowledge about prior calls from the same client session). Web requests of clients 102 are assigned to individual servers 110 by a load balancer 108. The load balancer 108 may reside on a separate machine and may be implemented in software, hardware or a combination of both. Alternatively, the load balancer 108 may reside on the same machine as one or more servers 110. As will be discussed in more detail below, the load balancer 108 ensures that client 102 is bound to a specific server 110 for the duration of the client's session. This allows one server to maintain the state of the client's session rather than inefficiently sharing that information across all servers.

In another configuration, the network architecture 100 may not include the load balancer 108. Rather, one or more of the servers 110 may perform the functionality of the load balancer 108 or the functionality of the load balancer 108 may not be provided at all (e.g., if there is only one instance of server 110).

As will be discussed in more detail below, the transaction manager 114 allows client software to issue several calls of the web service 112 and to request that multiple database changes resulting form these web service calls be part of a single database transaction, and take effect all at once, or none at all, depending on the final state of the transaction. A database transaction may consist of a connection to the database 116 and a transaction identifier tied to that connection. When the transaction manager 114 causes the database changes associated with a database transaction to be committed or rolled back, the transaction manager 114 terminates the database transaction by releasing the database connection back to the pool.

Figure 2:
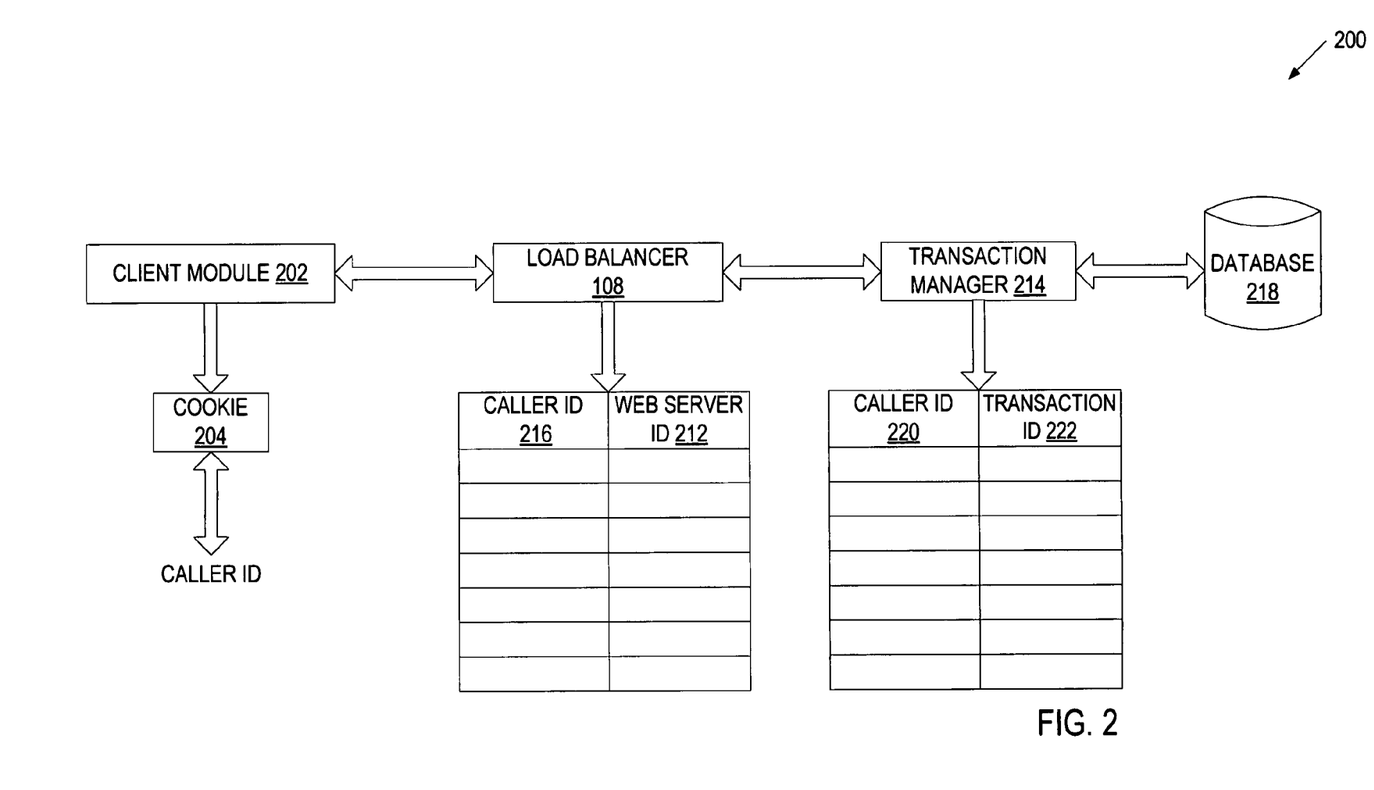
FIG. 2 illustrates transaction management operations in accordance with some embodiments of the present invention.

FIG. 2 illustrates transaction management operations 200 in accordance with some embodiments of the present invention. Before a client module 202 (hosted by client 102) can request a web service to perform a specific operation, it has to be authenticated by a server hosting the web service. In particular, the client module 202 issues an initial web service API call to perform authentication. This API call is intercepted by a load balancer 108, which assigns a caller identifier (ID) to the client module 202 and determines which server should handle the client request using a load-balancing algorithm. The load balancer 108 then associates the caller ID 216 with the server ID 212 and forwards the client's initial API call to a transaction manager 214 hosted by the server. The transaction manager 214 authenticates the client 202 by checking the client credentials included in the client request. If the client credentials are satisfactory, the transaction manager 214 creates a session using the caller ID, and sends the caller ID back to the client module 202 via a cookie (e.g., an HTTP cookie). The client module 202 stores cookie 204 in a local data store and maintains it for the life of its run cycle.

Next, the client module 202 issues another web service API call to start a database transaction. The client module 202 sends the cookie 204 with the start transaction API call. The load balancer 108 intercepts this API call and directs it to the designated server based on the cookie 204.

The transaction manager 214 receives the start transaction API call, ensures that the sender has been previously authenticated, and creates a new database transaction. In particular, the transaction manager 214 opens a database connection, creates unique transaction ID 222 and associates it with the caller ID 220 received via the cookie 204. Upon exit of the API call, the transaction manager 214 does not close the database connection but rather saves it in the state of the calling client.

Subsequently, the client module 202 issues a web service API call to request an operation that is part of the database transaction. Again, the web service API call is send with the cookie 204 and is intercepted by the load balancer 108 to determine which server should process this request using the cookie 204.

When the transaction manager 214 receives the web service API call, it ensures that the caller has been previously authenticated, and determines the transaction ID 222 based on the caller ID 220 from the cookie. Then, the transaction manager 214 restores the database connection and pending transaction onto the current thread and performs the web service API call. If the web service performs the requested operation successfully, the transaction manager 214 notifies the client module 202 about it. If not, the transaction manager 214 sends an error message to the client module 202. Data resulting from the operation performed by the web service remains uncommitted in database 218 (e.g., it is not seen by other callers).

The client module 202 repeats web service API calls until it decides that the database transaction is completed. At this point, the client module 202 issues an API call to commit or roll back data associated with the pending database transaction. This API call is passed to the transaction manager 214 in the manner discussed above. The transaction manager 214 then causes the data associated with the pending database transaction to be committed or rolled back, and terminates the database transaction by releasing the database connection back to the pool.

Alternatively, the transaction manager 214 may terminate the database transaction without receiving a commit or rollback API call from the client module 202. Instead, the transaction manager 214 may determine that a time period elapsed since the last API call received from client module 202 exceeds a predefined threshold (or the duration of the database transaction exceeds a predefined time interval), and may assume that the database transaction is no longer valid. The transaction manager 214 may then cause the data associated with the pending database transaction to be rolled back, and may terminate the database transaction by releasing the database connection back to the pool.

Figure 3:
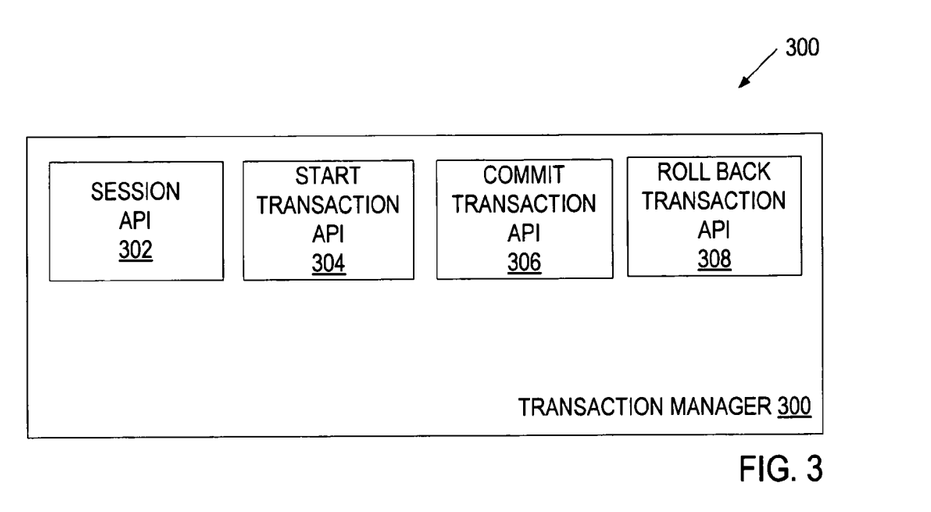
FIG. 3 is a block diagram of one embodiment of a transaction manager.

FIG. 3 is a block diagram of one embodiment of a transaction manager 300. The transaction manager 300 includes a set of APIs that facilitate management of database transactions. In particular, the transaction manager 300 includes a session API 302, a start transaction API 304, a commit transaction API 306 and a rollback transaction API 308.

The session API 302 is responsible for setting up a stateful session by creating a unique identifier and sending it back to the client software via a cookie (e.g., an HTTP cookie such as cookies created for use by web browsers). This may be configured as the same cookie name used by any load balancer in the environment to bind an inbound client connection to a specific web server and function as a point of unique identification inside the API software for the caller. This cookie will be passed back transparently to all API calls for the life of the client software run cycle. The session API 302 establishes a logical connection between the client software and a specific web server instance, and also establishes a stateful session identifier.

The start transaction API 304 creates a unique transaction ID and associates it with the caller ID from the cookie. Use of a separate distinct caller ID allows for parallel independent transactions from the client. Exiting an API call does not cause the database connection to be closed. Instead, the database connection is saved in the state of the calling client. Since all subsequent calls to the API framework will be directed back to the same server, via the cookie, the transaction manager 300 then detects a pending transaction and restores the database connection and pending transaction onto the current thread before continuing to process the API call.

The commit transaction API 306 causes the data associated with the pending database transaction to be committed to the database, and terminates the database transaction by releasing the database connection back to the pool. The rollback transaction API 308 causes the data associated with the pending database transaction to be rolled back (deleted from the database), and terminates the database transaction by releasing the database connection back to the pool.

Figure 4:
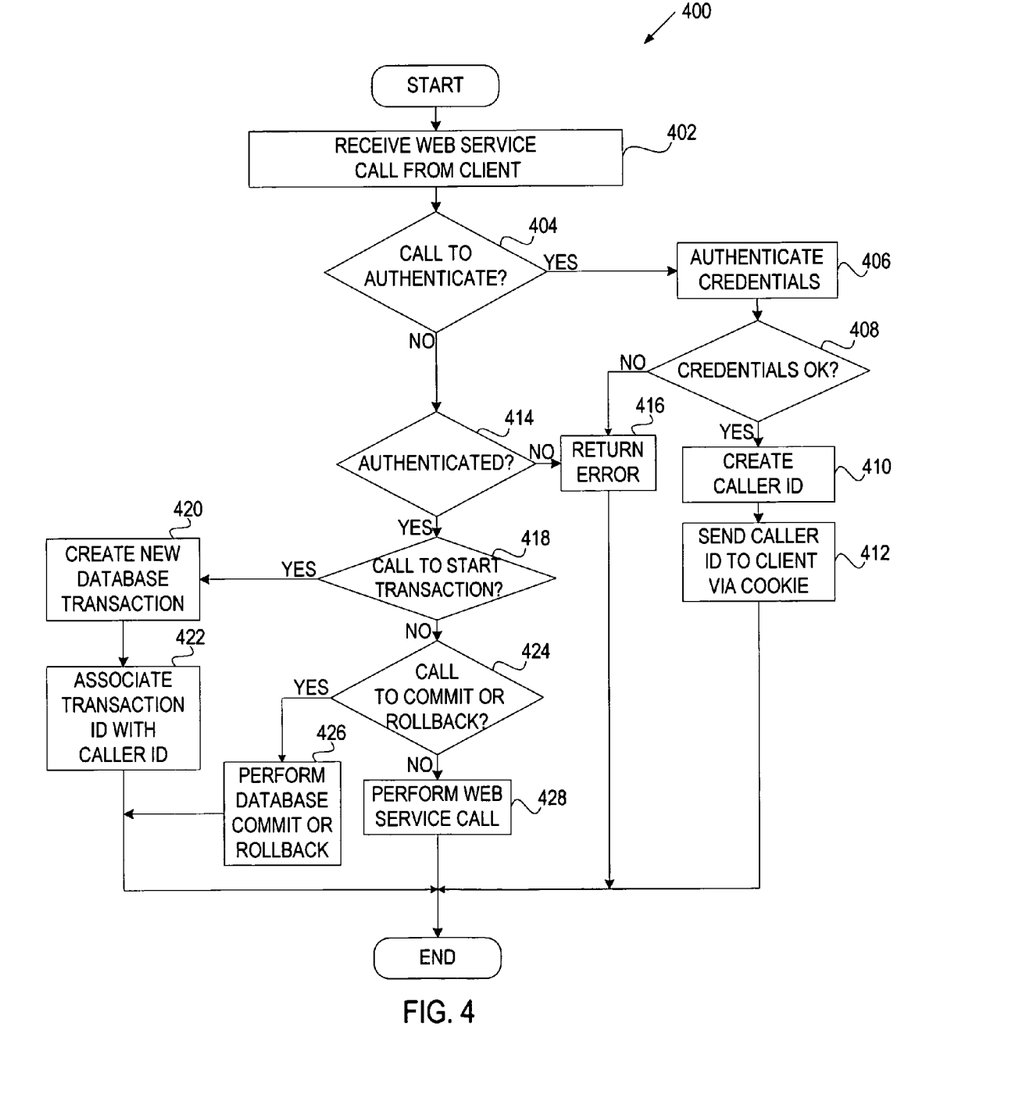
FIG. 4 is a flow diagram of a method for managing database transactions in a web service messaging environment, in accordance with one embodiment of the present invention.

FIG. 4 is a flow diagram illustrating one embodiment of a method 400 for managing database transactions. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, method 400 is performed by a server, such as server 110 of FIG. 1.

Referring to FIG. 4, method 400 begins with processing logic receiving a web service call from a client (block 402) and determining whether the web service call was issued to authenticate the client (block 404). If the web service call was issued to authenticate the client, processing logic authenticates the client credentials included in the client request (block 406) and determines whether the credentials are satisfactory (block 408). If not, processing logic returns an error message to the client (block 416). If so, processing logic creates a session using a caller ID assigned to the client (block 410), and sends the caller ID to the client via a cookie (block 412).

If the web service call was not issued to authenticate the client, processing logic determines whether the client has been previously authenticated using the caller ID included in the cookie passed with the web service call (block 414). If not, processing logic returns an error message to the client (block 416). If so, processing logic determines whether the current web service call is a call to start a new database transaction (block 418). If it is a call to start a new database transaction, processing logic creates a new database transaction (block 420), associates the database transaction ID with the caller ID (block 422), saves the database connection in the state of the calling client, and exits the web service call.

If the current web service call is not a call to start a new database transaction, processing logic determines whether the current web service call is a call to commit or rollback a pending database transaction. If so, processing logic causes the data associated with the pending database transaction to be committed or rolled back (block 426), and terminates the database transaction. If the current web service call us not a call to commit or rollback the pending database transaction, processing logic detects the pending transaction, restores the database connection and pending transaction onto the current thread, and performs the web service call (block 428).

Figure 5:
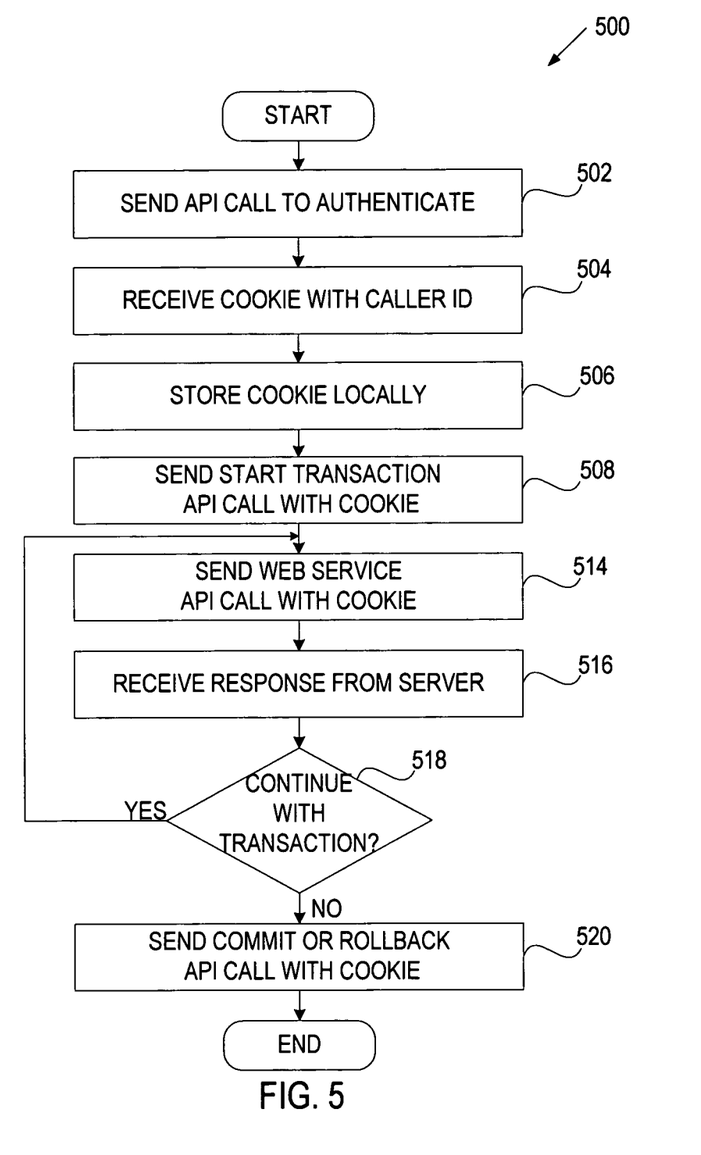
FIG. 5 is a flow diagram of a client-based method for handing a database transaction, in accordance with one embodiment of the present invention.

FIG. 5 is a flow diagram of a client-based method 500 for handing a database transaction, in accordance with one embodiment of the present invention. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method is performed by a client, such as client 102 of FIG. 1.

Referring to FIG. 5, method 500 beings with processing logic sending an API call to authenticate the client (block 502). In response, processing logic receives a cookie with a caller ID assigned to the client by the server (block 506) and stores the cookie locally for the life of the client run cycle (block 506).

At block 508, processing logic sends a start transaction API call with the cookie to the server. At block 510, processing logic sends a web service API call with the cookie to the server to request an operation that is part of the new database transaction. At block 516, processing logic receives a response from the server indicating whether the requested operation was performed successfully and determines whether the database transaction should continue (block 518). If so, processing logic returns to block 514. If not, processing logic sends a commit or rollback API call with the cookie to the server (block 520).

Figure 6:
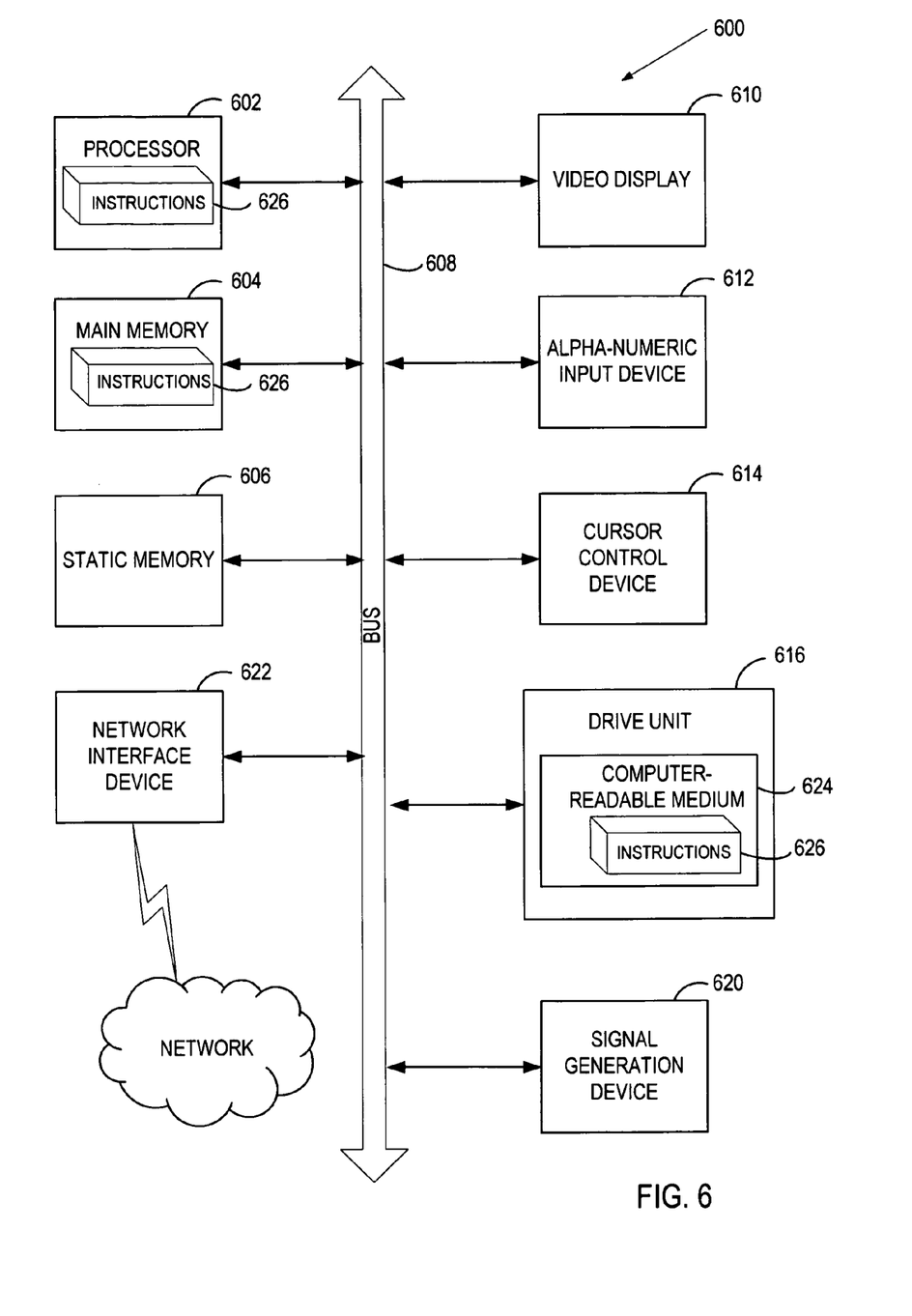
FIG. 6 illustrates a diagrammatic representation of a machine in the exemplary form of a computer system, in accordance with one embodiment of the present invention.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 618 (e.g., a data storage device), which communicate with each other via a bus 630.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The secondary memory 618 may include a machine-readable storage medium (or more specifically a computer-readable storage medium) 631 on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting machine-readable storage media. The software 622 may further be transmitted or received over a network 620 via the network interface device 608.

While the machine-readable storage medium 631 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer implemented method comprising:

receiving, at a server hosting a web service, an initial web service call from a client associated with a caller identifier;

upon authenticating the client, creating a client session using the caller identifier, and sending the caller identifier to the client, the caller identifier binding the client to the server for the duration of the client session;

receiving, from the client, a web service call indicating a beginning of a database transaction and comprising the caller identifier indicating that the client has been authenticated by the server;

creating the database transaction in response to the web service call indicating the beginning of the database transaction, wherein creating the database transaction comprises opening a database connection and associating an identifier of the database transaction with the caller identifier;

receiving, from the client, subsequent web service calls comprising the caller identifier during the client session;

for each subsequent web service call during the client session, determining the identifier of the database transaction using the caller identifier, restoring the database connection pertaining to the database transaction, and performing a corresponding subsequent web service call using the database connection while refraining from committing data resulting from the subsequent web service calls to a database; and upon receiving a web service call indicating an end of the database transaction, committing or rolling back the data resulting from the subsequent web service calls, and terminating the database transaction, wherein terminating the database transaction comprises releasing the database connection.

2. The method of claim 1 further comprising:
generating the caller identifier for the client.

3. The method of claim 1 wherein the caller identifier is sent to the client via a cookie.

4. The method of claim 1 wherein the initial web service call, the web service call indicating the beginning of the database transaction, and each subsequent web service call are XML-RPC calls.

5. The method of claim 1 wherein the caller identifier is used by a load balancer to bind the client to the server for the duration of the client session.

6. The method of claim 1 wherein terminating the database transaction comprises:

receiving a web service call to commit the data resulting from the subsequent web service calls; and causing the data to be committed to the database.

7. The method of claim 1 wherein terminating the database transaction comprises:

receiving a web service call to rollback the data resulting from the subsequent web service calls; and causing the data to be rolled back.

8. The method of claim 1 wherein terminating the database transaction comprises:

determining that a duration of the database transaction has exceeded a predetermined time interval; and causing the data resulting from the subsequent web service calls to be rolled back.

9. A non-transitory computer-readable storage medium including instructions that, when executed by a server machine, cause the server machine to perform a method comprising:

receiving, at the server machine hosting a web service, an initial web service call from a client associated with a caller identifier;

upon authenticating the client, creating a client session using the caller identifier, and sending the caller identifier to the client, the caller identifier binding the client to the server for the duration of the client session;

receiving, from the client, a web service call indicating a beginning of a database transaction and comprising the caller identifier indicating that the client has been authenticated by the server;

creating the database transaction in response to the web service call indicating the beginning of the database transaction, wherein creating the database transaction comprises opening a database connection and associating an identifier of the database transaction with the caller identifier;

receiving, from the client, subsequent web service calls comprising the caller identifier during the client session;

for each subsequent web service call during the client session, determining the identifier of the database transaction using the caller identifier, restoring the database connection pertaining to the database transaction, and performing a corresponding subsequent web service call using the database connection while refraining from committing data resulting from the subsequent web service calls to a database; and upon receiving a web service call indicating an end of the database transaction, committing or rolling back the data resulting from the subsequent web service calls, and terminating the database transaction, wherein terminating the database transaction comprises releasing the database connection.

10. The computer-readable storage medium of claim 9 wherein the method further comprises:
generating the caller identifier for the client.

11. The computer-readable storage medium of claim 9 wherein:
the caller identifier is sent to the client via a cookie.

12. The computer-readable storage medium of claim 9, wherein the initial web service call, the web service call indicating the beginning of the database transaction, and each subsequent web service call are XML-RPC calls.

13. The computer-readable storage medium of claim 9, wherein the caller identifier is used by a load balancer to bind the client to the server for the duration of the client session.

14. The computer-readable storage medium of claim 9 wherein terminating the database transaction comprises:
receiving a web service call to commit or rollback the data resulting from the subsequent web service calls; and
causing the data to be committed to the database or rolled back from the database.

15. The computer-readable storage medium of claim 9 wherein terminating the database transaction comprises:
determining that a duration of the database transaction has exceeded a predetermined time interval; and
causing the data resulting from the subsequent web service calls to be rolled back.

16. An apparatus, comprising:
a memory; and
a processing device, coupled to the memory, to cause:
a transaction manager to receive an initial web service call from a client associated with a caller identifier, to create, upon authenticating the client, a client session using the caller identifier, to send the caller identifier to the client, the caller identifier binding the client to the server for the duration of the client session, to receive, from the client, a web service call indicating a beginning of a database transaction and comprising the caller identifier indicating that the client has been authenticated by the server, to create the database transaction, to associate an identifier of the database transaction with the caller identifier, to receive, from the client, subsequent web service calls comprising the caller identifier during the client session, and for each subsequent web service call during the client session, to determine the identifier of the database transaction using the caller identifier, to restore the database connection pertaining to the database transaction, and to perform a corresponding web service call using the database connection while refraining from committing data resulting from the subsequent web service calls to a database; and the database, coupled to the transaction manager, to temporarily store the data resulting from the subsequent web service calls until the database transaction is terminated, wherein upon receiving a web service call indicating an end of the database transaction, the transaction manager is to commit or rollback the data resulting from the subsequent web service calls, and to terminate the database transaction by releasing the database connection.

17. The apparatus of claim 16 wherein the transaction manager is further to generate the caller identifier for the client.

18. The apparatus of claim 16 wherein:
the caller identifier is sent to the client via a cookie.

19. The apparatus of claim 16 wherein the initial web service call, the web service call indicating the beginning of the database transaction, and each subsequent web service call are XML-RPC calls.

20. The apparatus of claim 16 further comprising:
a load balancer to use the caller identifier to bind the client to the web server for the duration of the client session.

21. The apparatus of claim 16 wherein the transaction manager is to terminate the database transaction by:
receiving a web service call to commit or roll back the data resulting from the subsequent web service calls; and
causing the data to be committed to the database or rolled back from the database.

22. The apparatus of claim 16 wherein the transaction manager is to terminate the database transaction by:
determining that a duration of the database transaction has exceeded a predetermined time interval; and
causing the data resulting from the subsequent web service calls to be rolled back.

* * * * *